Dec. 17, 1940.  G. T. REICH  2,225,131
PURIFICATION OF INDUSTRIAL GASES
Filed Jan. 15, 1938
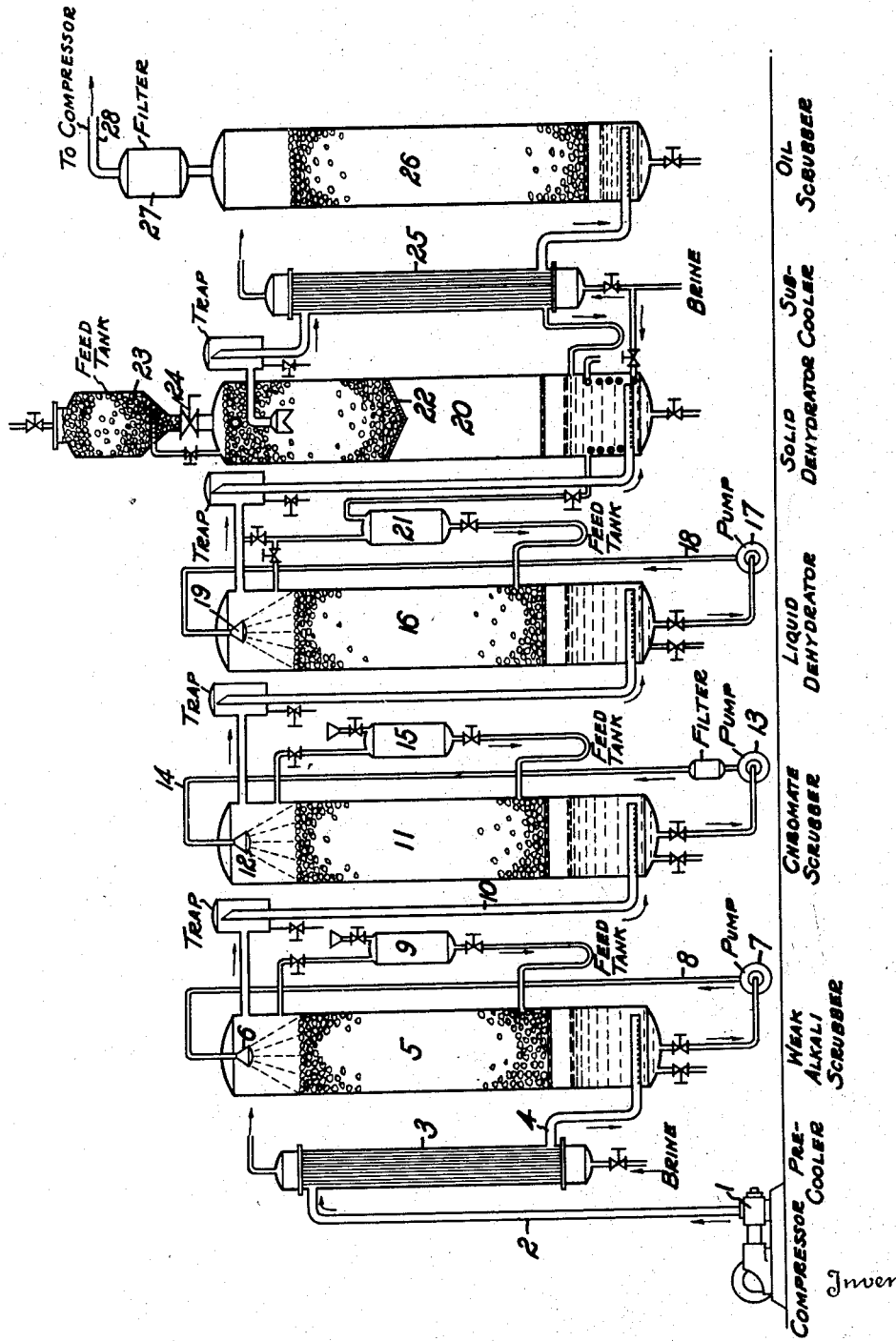
Inventor:
Gustave T. Reich
By Potter, Pierce & Scheffler
Attorneys.

Patented Dec. 17, 1940

2,225,131

UNITED STATES PATENT OFFICE 2,225,131

PURIFICATION OF INDUSTRIAL GASES

Gustave T. Reich, Philadelphia, Pa.

Application January 15, 1938, Serial No. 185,213

7 Claims. (Cl. 23—2)

This invention relates to a process for the purification of industrial gases which are contaminated with sulphur compounds, such as hydrogen sulphide. These sulphur compounds occur particularly in carbon dioxide gas obtained from coal, coke, limestone, cement and similar materials, and the process of the invention is particularly adapted to the purification of such gas.

When the carbon dioxide is intended for the manufacture of solid carbon dioxide (dry ice), it is desirable to produce a gas entirely free from hydrogen sulphide. Heretofore this has been very difficult and no satisfactory method whereby the hydrogen sulphide contained in carbon dioxide obtained from inorganic materials could be removed to a sufficient extent to make the gas suitable for the production of solid carbon dioxide has been available.

The principal object of the invention is the provision of a satisfactory method for the removal of sulphur compounds, such as hydrogen sulphide, from industrial gases and particularly from carbon dioxide gas from industrial sources.

I have found that hydrogen sulphide may be very effectively removed from industrial gases by treating the gas with a solution of an alkali chromate, particularly if the chromium compound is maintained in the chromate form during the treatment, for example, by the provision of sufficient alkali for this purpose. Alkali chromate solutions effectively remove sulphur compounds, such as hydrogen sulphide, from the gas, both cold and hot, producing a precipitate of solid sulphur which may be removed continuously or intermittently. The process of the invention thus provides not only a method of removing the hydrogen sulphide and similar sulphur compounds from industrial gases, but also a method whereby the sulphur compounds may be converted to a technically useful form. Although, the treatment may be carried out either cold or hot, in general, the treatment is more effective or more rapid in its effect at temperatures above normal room temperatures. The treatment may, however, be applied with satisfactory results at temperatures as low as the freezing point of water.

The treatment of such gases with bichromate solution is not comparable in its effect with the use of chromates. For example, I have found that when treating carbon dioxide gas containing 1% of hydrogen sulphide with solutions of sodium bichromate and sodium chromate of equivalent chromium content, the sodium chromate solutions are over 50 times as effective as the bichromate solutions.

The method of the invention will be more particularly described with reference to the accompanying drawing showing apparatus for the purification of carbon dioxide gas by a process embodying the principles of the invention.

In the purification process illustrated in the drawing, the crude carbon dioxide gas is compressed in compressor 1 to from 25 to 100 pounds pressure. The compressed gas passes through pipe 2 to precooler 3 wherein it is preliminarily cooled to near the freezing point of water (about 34° F.). A large part of the water separates out with some sulphur dioxide as well as some of the other impurities.

The gas is then passed through pipe 4 to the weak alkali scrubber 5 wherein the gas is treated with a weak alkali solution, such as sodium or potassium carbonate or bicarbonate. The weak alkali solution is recirculated from the bottom of scrubber 5 to the spray device 6 at the top of the scrubber by means of pump 7 and pipe 8. The carbon dioxide gas is bubbled up through a pool of the alkali solution in the bottom of the scrubber and then over a suitable filler material over which the sprayed alkali solution is circulated. Alkali solution may be added to the scrubber through tank 9. The sulphur dioxide content of the gas is completely removed in this operation.

The gas then passes to chromate scrubber 11 through pipe 10. Chromate scrubber 11 comprises a bottom section in which a pool of the chromate solution is maintained and an upper section which is filled with the usual filler materials. The chromate solution is recirculated from the pool to the sprayer 12 at the top of the scrubber by means of pump 13 and pipe 14. The chromium compound in the solution is maintained in the chromate form by adding an alkali metal hydrate, carbonate or bicarbonate to the solution either intermittently or continuously, for example, through tank 15. The alkali content of the solution is preferably maintained in excess of the amount required to keep the chromium compound in the chromate form by adding alkali compounds continuously in the same proportion as the chromate is converted to bichromate. The chromate solution may be passed through a suitable filter as indicated to remove precipitated sulphur and other insoluble components.

After the removal of sulphur compounds in the chromate scrubber, the carbon dioxide is passed through the liquid dehydrator 16 where it is treated with a calcium chloride solution. The dehydrator 16 is similar in construction to the chromate scrubber 11 and the calcium chloride solution is similarly circulated by means of pump 17 and pipe 18 to sprayer 19. The partially dehydrated carbon dioxide gas then passes to solid dehydrator 20. This dehydrator consists of three sections. The lower section contains calcium chloride solution of a higher concentration than the solution in liquid dehydrator 16. The lower section may be provided with cooling coils whereby a temperature of −20° F. may be obtained. The solution in the bottom of dehydrator 20 is not recirculated, but is gradually passed into liquid dehydrator 16 through tank 21 to maintain the concentration of the calcium chloride solution therein.

Above the lower section of the solid dehydrator containing the concentrated calcium chloride solution is a middle section which may be filled with a suitable filling material. Above the middle section is a grating 22 which supports lump or flake fused calcium chloride in the top section of the dehydrator. This section is kept full of lump or flake calcium chloride by means of feed hopper 23 and valve 24. The feed hopper is provided with a manhole for charging the calcium chloride, a small vent pipe and a carbon dioxide inlet pipe connected to the dehydrator.

Passing through dehydrator 20, the carbon dioxide gas is completely dehydrated. As the solid fused calcium chloride in the upper section of the dehydrator absorbs the last portions of moisture from the gas, is gradually deliquesces and drips down through the filling material in the middle section into the solution in the lower section of the dehydrator whereby it maintains the concentration of this solution.

The dehydrated gas passes from dehydrator 20 to a sub-cooler 25 and thence to an oil scrubber 26. Leaving the oil scrubber, the gas passes through filter 27 and pipe 28 to the compressor.

While a particular purification process embodying the principles of the invention has been described for the purpose of illustration, it will be obvious that the invention is not limited to the details of procedure or arrangement described and that the invention broadly comprises the purification of industrial gases by treating the gas with a solution of a hexavalent chromium compound maintained in the form of alkali chromate.

I claim:

1. A method of removing sulphur compounds from carbon dioxide gas which comprises treating the gas with a solution of a hexavalent chromium compound maintained in the form of alkali chromate.

2. A method of removing sulphur compounds from carbon dioxide gas which comprises treating the gas with a solution of alkali chromate and maintaining the hexavalent chromium in said solution in the form of alkali chromate by the addition of alkali.

3. A method of removing sulphur compounds from carbon dioxide gas which comprises treating the gas with a solution of a hexavalent chromium compound maintained in the form of alkali chromate and removing from the solution the solid sulphur thereby produced.

4. A process for the removal of sulphur compounds from flue gases and the like which comprises compressing and cooling the gas in the presence of water, separating the water, and thereafter contacting the gas with a solution of a hexavalent chromium compound maintained in the form of alkali chromate.

5. A process for the removal of sulphur compounds from flue gases and the like which comprises compressing and cooling the gas in the presence of water, separating the water, contacting the gas with a weak alkaline solution, and thereafter contacting the gas with a solution of a hexavalent chromium compound maintained in the form of alkali chromate.

6. A process for the removal of sulphur compounds from carbon dioxide gas which comprises contacting the gas with a weak alkaline solution and thereafter contacting the gas with a solution of a hexavalent chromium compound maintained in the form of alkali chromate.

7. A process for the removal of sulphur compounds from carbon dioxide gas which comprises contacting the gas with a cold, weak alkaline solution and thereafter contacting the gas with a hot solution of a hexavalent chromium compound maintained in the form of alkali chromate.

GUSTAVE T. REICH.